US006637367B1

(12) United States Patent
Dost et al.

(10) Patent No.: US 6,637,367 B1
(45) Date of Patent: Oct. 28, 2003

(54) METHOD AND APPARATUS FOR EASY TRANSPORT OF AN ANIMAL BED, OF PARTICULAR USE FOR DOGS

(75) Inventors: Janice Dost, Berkeley, CA (US); Bill Dost, Berkeley, CA (US); Eleanor A. Elliott, Berkeley, CA (US); Joyce M. Figg, Richmond, CA (US); Paul E. Figg, Richmond, CA (US); Peter Klement, Berkeley, CA (US); Winifred E. Landers, Palm Bay, FL (US); Samuel Landers, Palm Bay, FL (US); Paula Lewis, Oakland, CA (US); Odessa McDuffie, Oakland, CA (US); Dianne Sequoia, El Cerrito, CA (US)

(73) Assignee: Dost, Figg, Elliott, et al., LLC, Berkeley, CA (US)

( * ) Notice: Subject to any disclaimer, the term of this patent is extended or adjusted under 35 U.S.C. 154(b) by 0 days.

(21) Appl. No.: 09/949,343

(22) Filed: Sep. 10, 2001

(51) Int. Cl.[7] .............................................. A01K 29/00
(52) U.S. Cl. ...................................... 119/28.5; 119/907
(58) Field of Search ................................ 119/792, 850, 119/856, 907; D30/145; 54/78, 79.1, 79.2, 44.1; 224/191, 609, 649, 901.8, 905

(56) References Cited

U.S. PATENT DOCUMENTS

| 557,011 A | * | 3/1896 | Murray ...................... 224/236 |
|---|---|---|---|
| 747,681 A | * | 12/1903 | Bradbury ..................... 224/602 |
| 1,040,016 A | * | 10/1912 | Robbins ...................... 224/245 |
| 4,258,869 A | * | 3/1981 | Hilgendorff ................. 224/429 |
| 4,442,960 A | * | 4/1984 | Vetter .......................... 224/417 |
| 4,483,469 A | * | 11/1984 | Arisland ..................... 224/582 |
| 4,879,865 A | * | 11/1989 | Van Scoyk ..................... 54/66 |
| 5,184,762 A | * | 2/1993 | Nevitt ...................... 224/148.6 |
| 5,226,384 A | | 7/1993 | Jordan |
| 5,560,321 A | | 10/1996 | Hess |
| 5,603,284 A | | 2/1997 | Freedman |
| 5,644,902 A | * | 7/1997 | Kemp ......................... 54/37.1 |
| D383,255 S | * | 9/1997 | Caditz ....................... D30/145 |
| 5,685,257 A | | 11/1997 | Feibus |
| 5,839,393 A | * | 11/1998 | Rupp et al. ................. 119/712 |
| 5,887,772 A | * | 3/1999 | Dooley ....................... 224/191 |
| 5,970,921 A | | 10/1999 | Fulton |
| 6,010,050 A | * | 1/2000 | Tarr ........................... 224/578 |
| D429,390 S | | 8/2000 | Grady et al. |

* cited by examiner

Primary Examiner—Thomas Price
(74) Attorney, Agent, or Firm—Harris Zimmerman

(57) ABSTRACT

A method of carrying an animal bed includes placing a harness on an animal, folding the bed, inserting the bed in and between center-facing pouches of a pack, and attaching the pack to the harness. Apparatus for carrying out the method is described wherein the pack has a protective cover covering the openings of the center facing pouches, the cover having a body strap attached thereto.

9 Claims, 5 Drawing Sheets

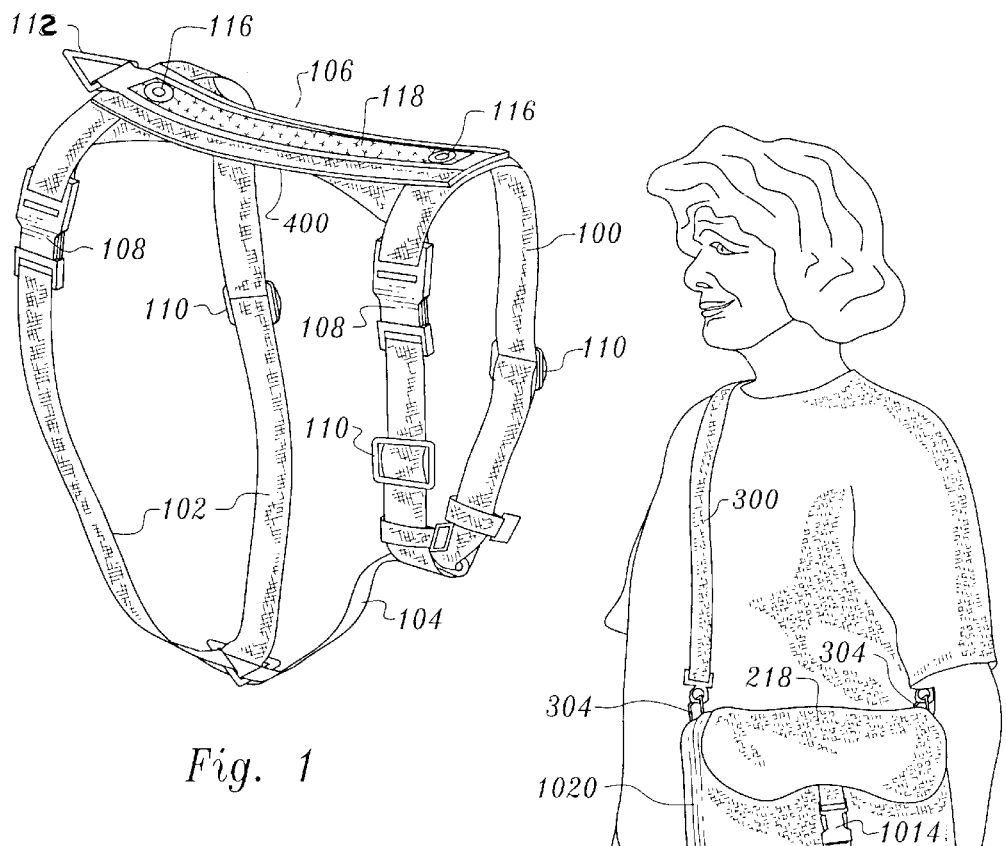
Fig. 1
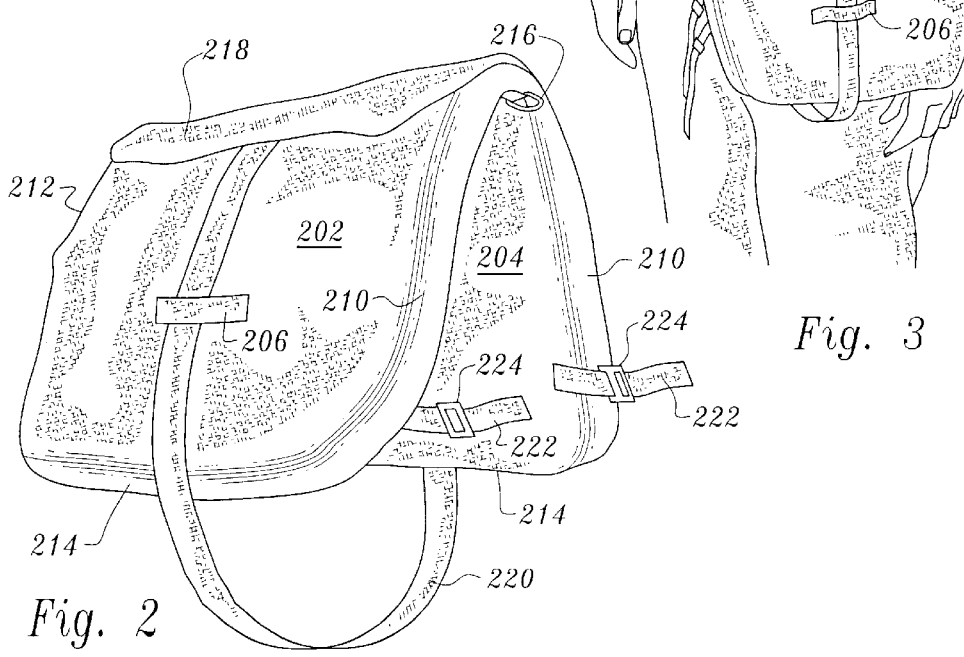
Fig. 2
Fig. 3

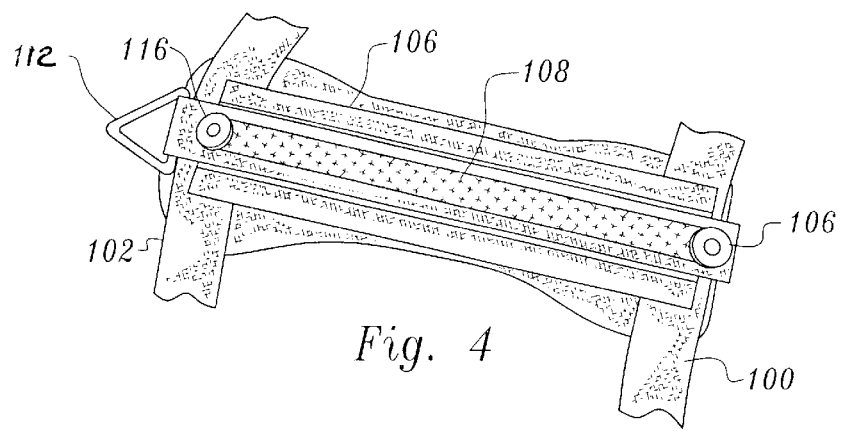
Fig. 4
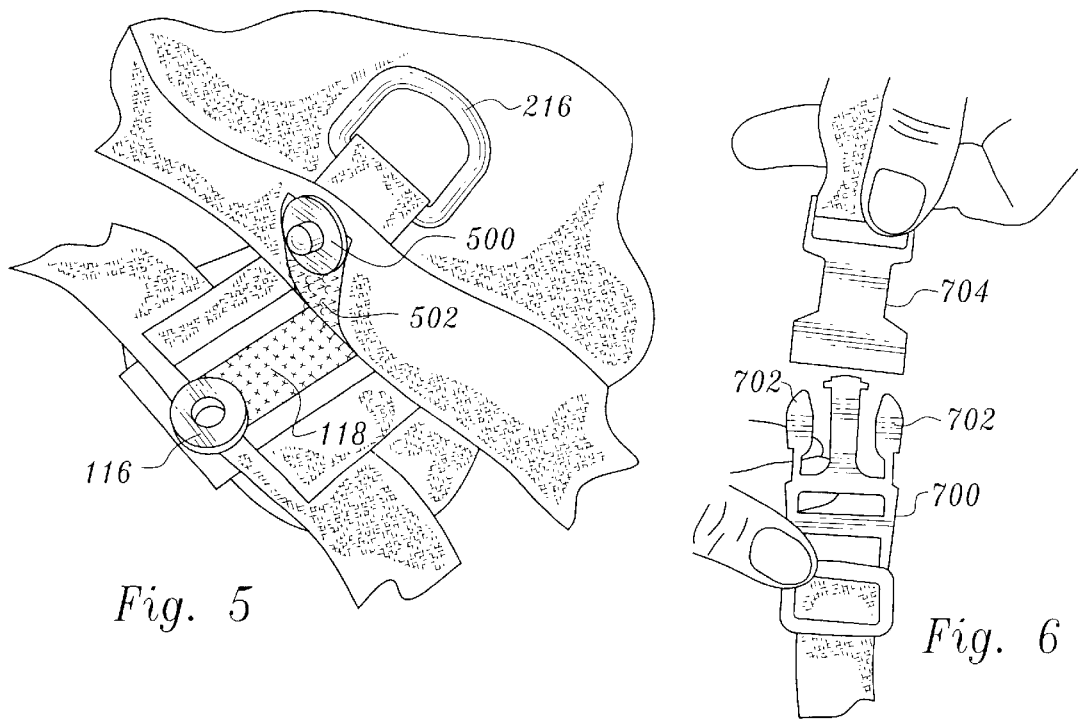
Fig. 5
Fig. 6
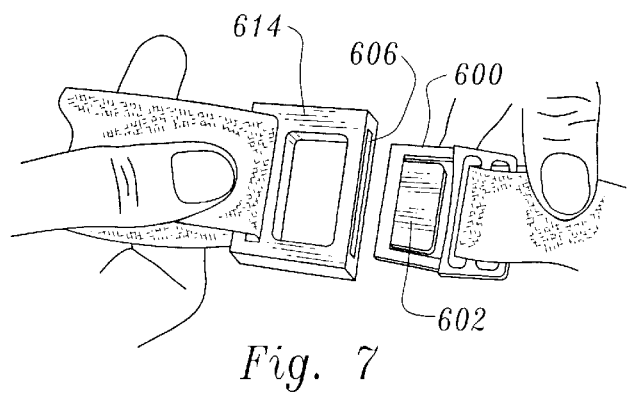
Fig. 7

METHOD AND APPARATUS FOR EASY TRANSPORT OF AN ANIMAL BED, OF PARTICULAR USE FOR DOGS

FIELD OF THE INVENTION

The invention relates to the fields of animal harness, dog packs and pet bedding. In particular, the invention relates to a pack suitable for wear by dog, other animal, or human, having a detachable animal harness. The pack is intended for transport of a folded animal bed attached thereto, the animal bed in turn having storage compartments for storing the pack components when the pack is not in use.

BACKGROUND OF THE INVENTION

Numerous varieties of harness and packs for wear by dogs are known. Further, such harness and packs are known that have multiple compartments. For example, U.S. Pat. No. 5,560,321, issued Oct. 1, 1996, illustrates an animal harness having two attached pouches for transport of litter bags and feces. The harness has a first strap for attachment about the body of the animal, the first strap also attached to both pouches. A second strap perpendicular to the first strap has ends attached to the first strap, and has a middle portion for attachment about the base of the animal's neck forward of the forelegs. A third strap perpendicular to the second strap is intended for wear over the shoulders of the animal. The harness appears to be permanently attached to the pouches. Other dog packs are, illustrated in U.S. Pat. Nos. 5,644,902 and 5,887,772.

Animal beds having a resilient core, such as rubber or polymeric foam, encased in a fabric cover, are described in U.S. Pat. No. 5,226,384, issued Jul. 13, 1993, and U.S. Pat. No. 5,685,257 issued Nov. 11, 1997. Such beds have the ability to insulate and protect an animal from contact with cold, damp, hard or hot surfaces which can be uncomfortable for the animal, and which can result in a variety of physical problems and may exacerbate pre-existing physical problems or medical conditions.

Many animals, including dogs, are mobile. Exercise is recognized as beneficial to dogs, and dog owners often take their dogs for walks. Dog owners also may take their dogs with them while traveling and visiting friends and relatives. Typical animal beds are not, however, easily portable. It is desirable to have an animal bed, intended for use by a dog, that is easily portable and can be carried by a dog. It is also desirable that, when configured for carriage by the dog, the dog also be capable of carrying some additional supplies.

SUMMARY OF THE INVENTION

A soft-sided pack has at least two center-facing pouches and a protective cover covering the pouch openings. The pack has an adjustable, detachable harness permitting it to be worn by a dog or other animal of similar size, and a detachable strap for use either as a leash, a shoulder strap, or belt.

Attached to the pack is an animal bed. The bed is made of resilient material enclosed within a bed cover made of fabric such as an aramid fabric, polyester or nylon. The bed is formed such that it may easily fold along three parallel fold lines, the fold lines dividing the bed into four sections. The cover includes pockets for storing pack components when the device is used as a bed.

When folded along the fold lines, the bed can be placed in and between the center-facing pouches of the pack, the gap between the center-facing pouches being covered by the cover. The pack may then be attached to the removable harness for wear by the animal, with the strap used as a leash. Alternatively, the pack may be folded, attached to the strap, and worn by a human as a shoulder bag, fanny pack, or back pack.

BRIEF DESCRIPTION OF THE DRAWING

FIG. 1 is an illustration of an animal harness having attachment apparatus for attachment to a pack.

FIG. 2, an illustration of the pack of the present invention.

FIG. 3, an illustration of the pack of the present invention worn by a human using an adjustable strap as a shoulder strap.

FIG. 4, an illustration of the attachment apparatus of the animal harness of FIG. 1.

FIG. 5, an illustration showing attachment of the pack of FIG. 2 to the harness of FIG. 1.

FIG. 6, an illustration of a side-squeeze quick-release buckle as known in the art.

FIG. 7, an illustration of a center-squeeze quick-release buckle as known in the art.

DETAILED DESCRIPTION OF THE EMBODIMENTS

Figure 8:
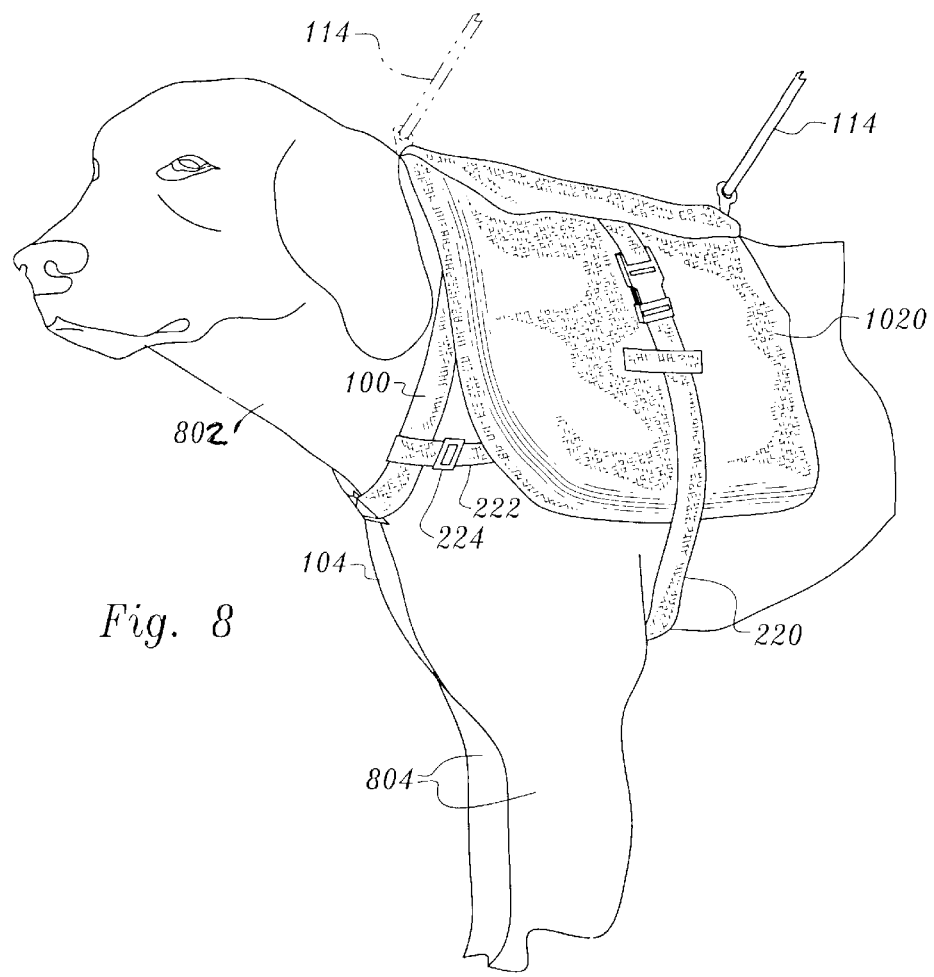
FIG. 8, an illustration showing an animal wearing the harness of FIG. 1 assembled to the pack of FIG. 2, and showing alternate positions for attachment of the adjustable strap as a leash thereto.

With reference to FIGS. 1, 4, and 8, an animal harness comprises an adjustable neck strap 100 for wear by an animal at the base of the animal's neck 802 in front of its front legs 804. The harness also has an adjustable body strap 102 for wear about the animal's body between its front legs. The body strap is typically worn about the animal's chest. Neck strap 100 and body strap 102 are interconnected by a chest strap 104 and a back strap 106. Neck strap 100, body strap 102, and back strap 106 are permanently attached to each other, typically by sewing. A back pad 400 may also be attached along the back strap 106 and attached to the collar 100 and body strap 102.

Body strap 102 and neck strap 100 have quick-release buckles 108 permitting them to be rapidly opened so that the harness may be removed from the animal. These quick release buckles 108 also permit rapid attachment of the harness to an animal, especially if the strap 100 and body strap 102 have previously been adjusted for correct length to fit the animal. Neck strap 100 and body strap 102 each have buckles 110 as known in the art for adjustment of strap length.

The harness is equipped with one or more attachment rings 112 for coupling the harness to a leash 114. On the dorsal surface of the back strap 106 are attachment apparatus for attaching the harness to a pack. The attachment apparatus may include snap type fasteners 116 and the loop side of a hook-and-loop fastener 118 such as Velcro.

Figure 9:
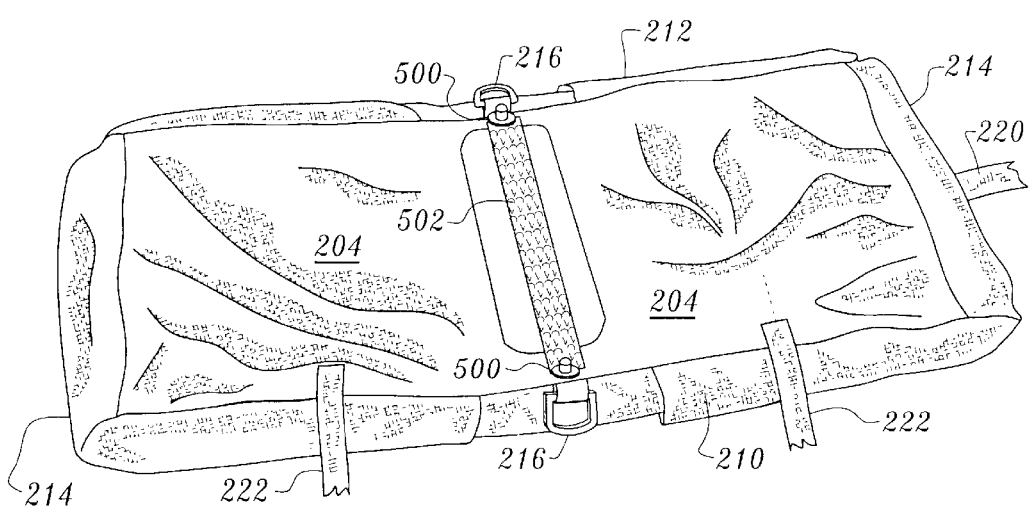
FIG. 9, an illustration of the ventral side of the pack, showing apparatus for attaching the pack to the harness.
Figure 10:
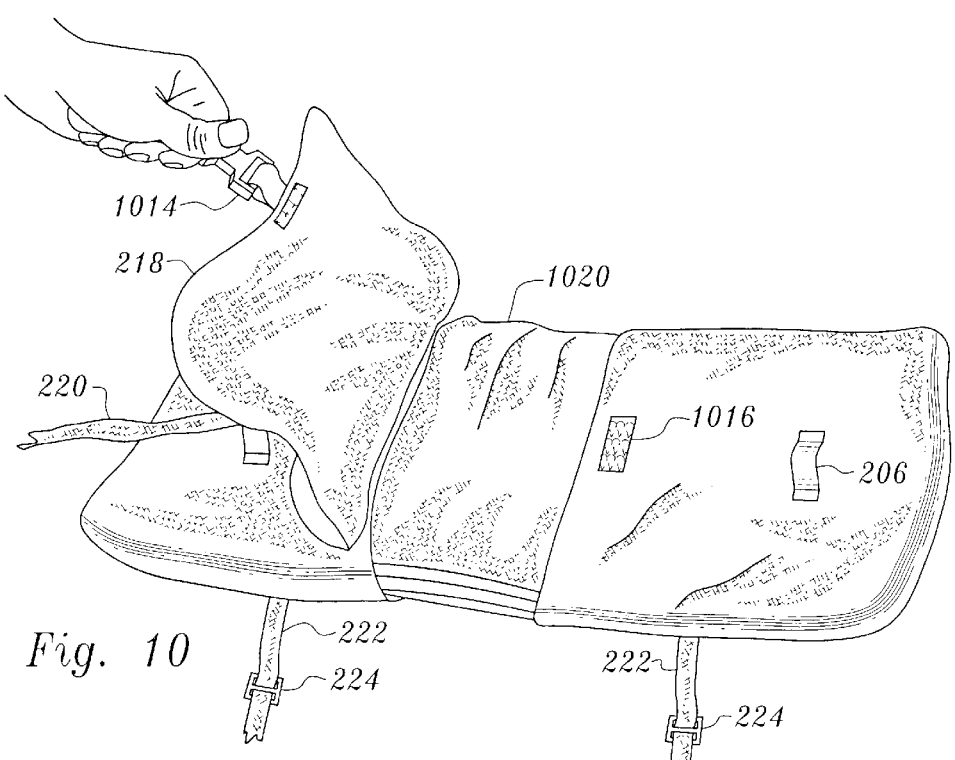
FIG. 10, an illustration of the dorsal side of the pack, showing the cover, and its two center-facing compartments for holding a folded animal bed.

With reference to FIGS. 2, 9, and 10, a soft-sided pack is typically fabricated from fabric by sewing. The pack has a top surface 202 and a bottom surface 204. The top surface 202 is interrupted in the center, such that it forms two pouches. The top surface has two strap guide loops 206 permanently attached to it, one on each pouch. Between the top surface 202 and bottom surface 204 is an edge surface, the edge surface further divided into front 210, rear 212, and side 214 surfaces. The pack has at least two D-rings 216 attached to it at the midpoint of the front and rear surfaces.

A protective cover 218 is attached to the pack such that it may cover the interruption between pouches in the top surface 202. The cover is equipped with a cover body strap 220, equipped with quick release buckles 1014, and hook-and-loop fasteners 1016 for retaining it in proper position when closed. When the pack is in use, cover body strap 220 is routed through strap guide loops 206. Cover 218 may, but need not, be permanently attached to the pack top surface 202 along one edge.

Attached to the pack at a joint of bottom surface 202 and front surface 210, near each side surface 214 is an auxiliary strap 222. Each auxiliary strap 222 is equipped with a buckle 224 such that it may be fastened about the neck strap 100.

The convertible leash/shoulder-strap/waist-belt strap 300 is equipped with clips 304 at each end, and buckles for adjusting its length. When it is desired for a human 302 to carry the pack, clips 304 are coupled to the D-rings 216 of the pack. Strap 300 may then be worn over the shoulder to conveniently carry the pack and its enclosed bed.

With reference to FIGS. 5 and 9, the bottom surface of the pack is equipped with attachment apparatus for connecting it to the mating attachment apparatus of the harness. In the illustrated embodiment, there is a snap fastener 500 for mating with the snap fastener 116 of the harness, and the hook portion 502 of a hook-and-loop fastener for mating with the loop portion 118 on the harness. With reference to FIG. 8, when it is desired that an animal carry the pack, the harness of FIG. 1 is placed upon the animal, the bed 1020 is folded and installed in the pack, the pack is attached to the harness, cover body strap 220 is fastened about the animal, and auxiliary straps 222 coupled about the neck strap 100. The owner may then select a D-ring of the D-rings 216 or 112 and couple the convertible strap 300 as a leash in aft position 114, or alternatively in forward position 800.

The quick release buckles may be of the side-squeeze type illustrated in FIG. 6 or of the center squeeze type as illustrated in FIG. 7, or other quick-release buckles as known in the art. Side-squeeze quick release buckles comprise a male portion 600 having springy ears 602 that fit into a female portion 604. The buckle is released by squeezing the ears 602 through openings 606 in the female portion. Center-squeeze quick-release buckles have a male portion 700 with a springy tongue 702 that fits into and locks in a female portion 704. The buckle is released by squeezing the springy tongue 702 through an opening 706 in the female portion 704, releasing the tongue and thus the male portion from the female portion.

Figure 11:
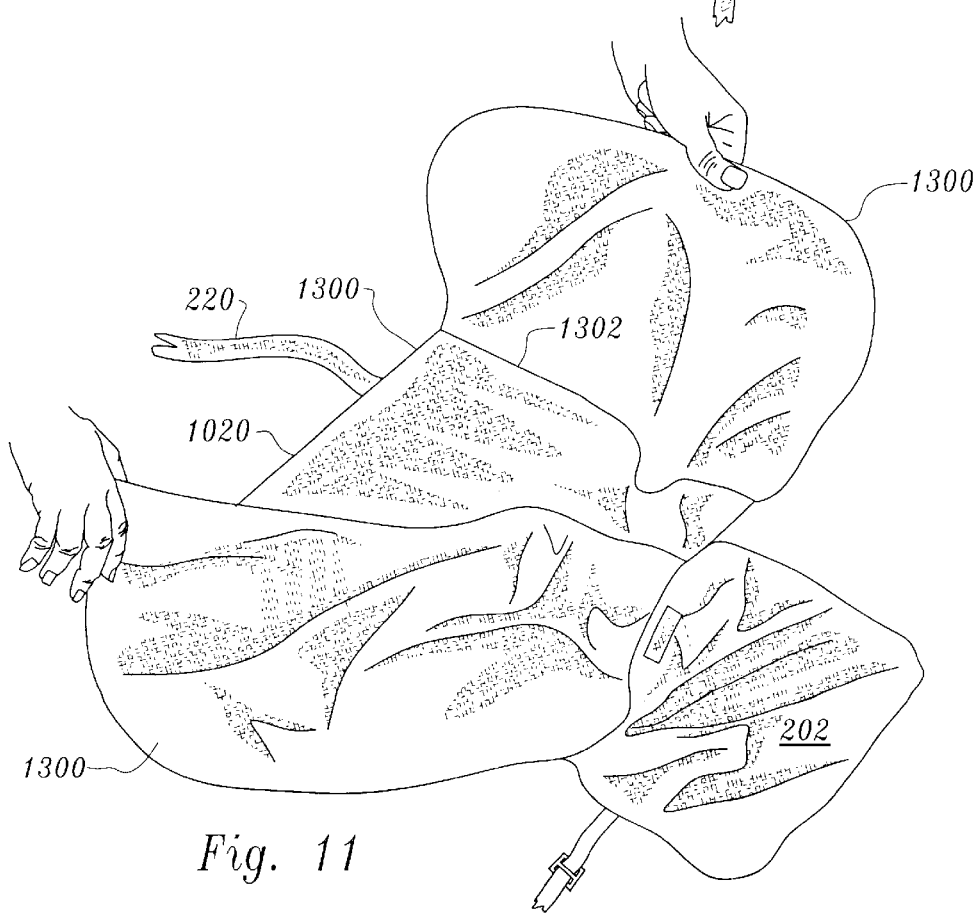
FIG. 11, an illustration showing the animal bed being opened from the center-facing pack compartments.
Figure 13:
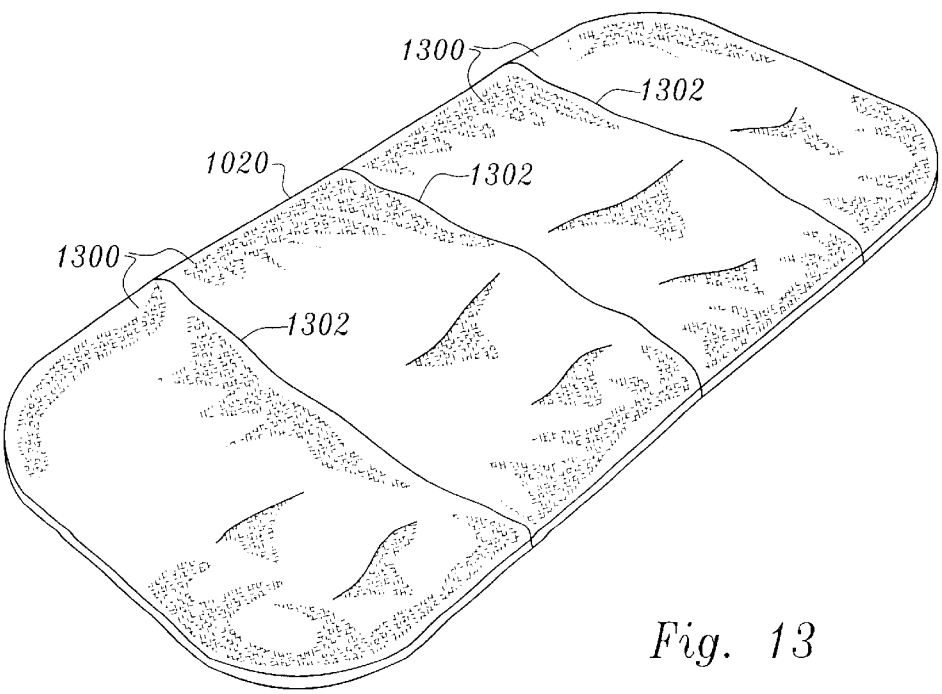
FIG. 13, an illustration of the device used as an animal bed.

With reference to FIGS. 10, 11, and 13, the animal bed 1020 is made of a resilient core material enclosed within a fabric cover, and is designed such that it has four panels 1300 and folds readily along three fold lines 1302. Fold lines 1302 may be formed by cutting the resilient material along that line and stitching the top and bottom of the fabric cover together along that line. Other methods of making an easily-folded line may also be used.

Figure 12:
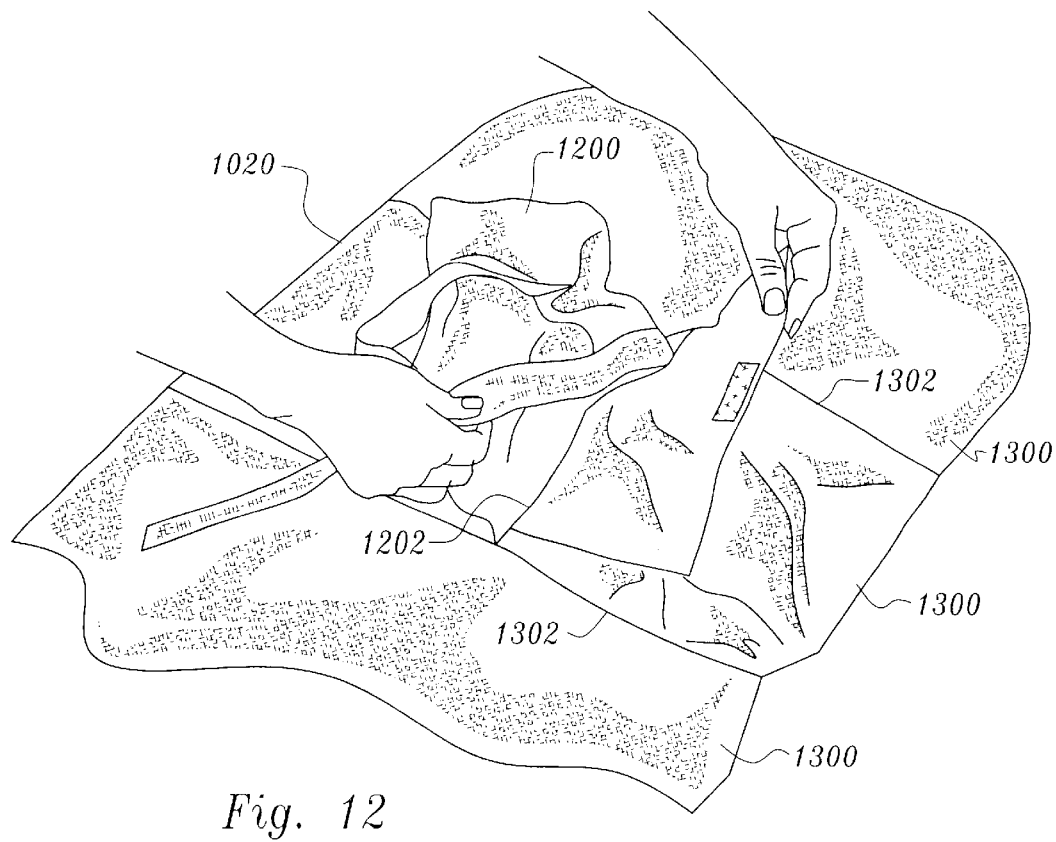
FIG. 12, an illustration showing the pack components being stored in a pocket on the undersurface of the bed.

As shown in FIG. 11, the animal bed 1020 may be pulled out of the pouches formed in the pack by the gap in the top surface 202. The bed may then be unfolded. As shown in FIG. 12, the pack 1200 may be inserted into pockets 1202 on the bottom surface of bed 1020; which may then be flipped over (FIG. 13) for use by an animal.

When it is desired to transport the bed, the harness of FIG. 1 is placed about the animal. Pack components are removed from storage pocket 1202. The bed 1020 is folded along fold lines 1302 and installed in the pack as shown in FIGS. 11 and 10, the pack is attached to the harness as shown in FIG. 5, the cover body strap 220 is fastened about the animal as shown in FIG. 8, with auxiliary straps 222 coupled about the neck strap 100. The owner may then select a D-ring of the D-rings 216 or 112 and couple the convertible strap 300 as a leash in aft position 114, or alternatively in forward position 800.

While the invention has been described with reference to assembly of by sewing, other forms of assembly known in the art may also be used. For example, heat-sealing or thermal bonding, solvent-welding, and gluing may be used to assemble portions of the harness and pack when suitable materials are used.

An alternative embodiment (not shown) of the present invention is fabricated by stitching top surface 202 (FIG. 2) to the bottom surface 204 directly, without separate edge surfaces 210, 212, and 214. In this embodiment, the D rings 216 and auxiliary straps 222 are in approximately the same positions as heretofore described.

While the invention has been described with reference to buckles 224 on the auxiliary straps 222 for fastening attaching them to neck strap 100, it is anticipated that other attachment apparatus may be used including quick-release buckles, snap fasteners, and knots. Similarly, while the attachment apparatus for attaching the pack to the harness has been described with reference to a snap fastener and hook-and-loop fastener, alternative attachment apparatus may be used. Such alternative attachment apparatus may include one or more of snaps, hook-and-loop fasteners, twist-lock devices, buttons, rings and clips, or quick-release buckles.

While the invention has been described with reference to two center-facing pouches, the pack may have additional pouches formed on it Such additional pouches are of particular use in transporting additional material or supplies required for the care and maintenance of a dog, such as medications, scoops and bags for recovery and transport of excrement, brushes, or treats.

While the invention has been particularly shown and described with reference to a preferred embodiment thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. Apparatus enabling carrying of an animal bed by a quadruped animal comprising:

a harness having a neck strap proportioned to extend around a neck region of the animal and having a body strap proportioned to extend around the animal at a location behind forelegs of the animal, a bottom portion of said harness having a chest strap extending between the neck strap and the body strap and a top portion of the harness having a back strap extending between the neck strap and the back strap;

a pack formed of flexible material and being proportioned to extend over said harness and to extend downward at each side of the harness and having a pair of pouches each being located for positioning against an opposite side of the animal when the pack is emplaced on the harness, said pouches having open ends which are spaced apart at a central region of the pack and which are situated at upper ends of the pouches when the pack is emplaced on the harness;

a releasable fastener for attaching said pack to said harness, said fastener having a first component secured to said harness and a disengagable second component secured to said pack;

a foldable substantially flat animal bed proportioned to extend across said central region of the pack and to extend down into said pouches at each side of the animal; and a protective cover proportioned to extend between said pouches above said animal bed and to overlap said open ends of said pouches when said pack is emplaced on said animal.

2. The apparatus of claim 1 wherein said releasable fastener for attaching said pack to said harness has a first component secured to said back strap of said harness and a disengagable second component secured to said pack substantially midway between said pouches.

3. The apparatus of claim 2 further including a pair of auxiliary straps attached to said pack at separate locations which are at opposite sides of the animal when the pack is emplaced on the animal, each auxiliary strap being fastenable to said neck strap of said harness.

4. The apparatus of claim 1 wherein said protective cover is permanently fastened to said pack at a location adjacent to the open end of one of said pouches.

5. The apparatus of claim 1 wherein a cover strap extends from said cover and is proportioned to extend around said pack and said animal when said pack is emplaced on said animal, said cover strap having first and second separable portions joined by a disengageable buckle.

6. The apparatus of claim 5 further including a pair of cover strap positioning loops each being secured to an exterior surface of a separate one of said pouches and forming a passage through which the cover strap is passed.

7. The apparatus of claim 1 wherein said animal bed has a plurality of parallel fold lines preformed therein.

8. The apparatus of claim 1 wherein said animal bed has a pocket thereon proportioned to receive and store said pack when said pack is not in use.

9. The apparatus of claim 1 further including a dual purpose leash and carrier strap having a disenageable fastener at each end, said harness having a first fastener engagement for engagement by one of said fasteners when said dual purpose strap is used as a leash and said pack having spaced apart second and third fastener engagements for engagement by both of said fasteners enabling use of said dual purpose strap to suspend said pack on the body of a human carrier.

* * * * *